United States Patent Office 3,296,180
Patented Jan. 3, 1967

3,296,180
VINYL CHLORIDE RESINS PLASTICIZED WITH SUBSTITUTED CYCLOHEXYL ALKYL PHTHALATES
Louis O. Raether, Webster Groves, Mo., assignor to Monsanto Company, a corporation of Delaware
No Drawing. Filed Jan. 4, 1963, Ser. No. 249,310
1 Claim. (Cl. 260—31.8)

This invention relates to new and useful halogen-containing vinyl resin compositions. In particular this invention relates to new and improved halogen-containing vinyl resin compositions containing certain substituted cyclohexyl alkyl phthalates.

Normally, vinyl halide polymers such as polyvinyl chloride and copolymers thereof, which are widely employed in the plastics industry, are quite hard and brittle in nature and require the addition of substantial proportions of a plasticizer to improve their workability. Since some of the plasticizer is ordinarily retained in the plastic product, it is desirable that it possess certain characteristics. Among these desirable characteristics is the ability of a plasticizer to impart low-temperature flexibility to the product. The plasticizer must also be of low volatility to prevent its loss by evaporation. It is also desirable that the plasticizer be one which does not allow the finished product to become hard and brittle and thereby easily fractured.

It is accordingly an object of this invention to provide improved halogen-containing vinyl resin compositions.

It is a further object of this invention to provide novel plastic compositions comprising halogen-containing resins and certain substituted cyclohexyl alkyl phthalate esters.

A still further object is to provide new resinous compositions having desirable physical properties.

Other objects and advantages of the invention will be apparent to those skilled in the art from the following detailed description and claims.

In accordance with this invention, it has been found that the above and still further objects are achieved by incorporating a halogen-containing vinyl resin and, as a plasticizer, a substituted cyclohexyl alkyl phthalate ester of the type hereinafter described.

Generally speaking about 5 to 200 parts by weight of plasticizer can be used for each 100 parts by weight of halogen-containing vinyl resin. However, it is preferred to use from about 20 to 100 parts by weight of plasticizer per 100 parts by weight of resin.

This invention is particularly applicable to polymerized vinyl chloride resins and to resins formed by the conjoint polymerization of vinyl chloride with other materials such as vinyl acetate, vinyl propionate, vinylidene chloride, methyl methacrylate or diethylmaleate.

For many purposes it may be desirable to blend other conventional additives with the plasticized vinyl halide polymer compositions of the present invention. Illustrative of such additives are fillers, dyes, pigments, heat and light stabilizers, lubricants and the like. It will be apparent that compositions containing such other additives are within the scope of this invention.

The halogen-containing resins of this invention are those derived from such vinyl compounds as vinyl chloride, vinylidene chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide such as vinyl chloride with other monomers such as vinylidene chloride; vinyl esters of carboxylic acids, e.g., vinyl acetate, vinyl propionate, vinyl butyrate and vinyl benzoate; esters of unsaturated acids, e.g. alkyl acrylates such as methyl acrylate, ethyl acrylate, propyl acrylate, butyl acrylate, allyl acrylate, and the corresponding esters of methacrylic acid; vinyl aromatic compounds, e.g. styrene ortho-chlorostyrene, para-chlorostyrene, 2,5 - dichlorostyrene, 2,4-dichlorostyrene, para-ethyl styrene, vinyl naphthalene and α-methyl styrene; dienes such as butadiene and chlorobutadiene; unsaturated amides such as acrylic acid amide and acrylic acid anilide; unsaturated nitriles such as acrylic acid nitrile; and esters of $\alpha,\beta$-unsauturated carboxylic acids, e.g. the methyl, ethyl, propyl, butyl, amyl, hexyl, heptyl, octyl, allyl, methallyl and phenyl esters of maleic, crotonic, and fumaric acids and the like. It should be recognized that the halogenated resins containing halogens other than chlorine, e.g. bromine, fluorine and iodine, are also operable in this invention. Said halogenated resins may contain a varying proportion of halogen depending upon the nature of the resin and its contemplated use. Those copolymers in which a predominant portion, i.e., more than 50% by weight of the copolymer is made from a halogen-containing vinylidene monomer such as vinyl chloride, represent a preferred class of polymers to be treated according to this invention.

The substituted cyclohexyl alkyl phthalate plasticizers useful with the invention are generally characterized by the following formula

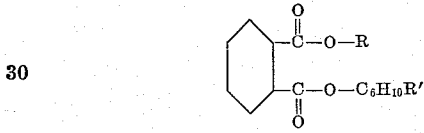

where R is an alkyl radical having from 10 to 13 carbon atoms, R' is an alkyl radical having from 4 to 12 carbon atoms and R plus R' have a total of from 14 to 22 carbon atoms.

The foregoing substituted cyclohexyl alkyl phthalate esters are readily prepared by various means known to the art. The phthalate esters used in this invention are preferably prepared by reacting phthalic anhydride with the substituted cyclohexanol to form the phthalic half ester and then reacting said half ester with the aliphatic alcohol in the presence of an acid esterification catalyst. Said preferred method is described in United States Patent Number 2,862,959 granted December 2, 1958 to Tracy M. Patrick, Jr. and Louis O. Raether.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Low-temperature flexibility.*—Low-temperature flexibility is one of the most important properties of elastomeric vinyl compositions. While many plasticizers will produce flexible compositions at room temperature, the flexibility of these compositions at low temperature may vary considerably, i.e., plasticized polyvinyl chloride compositions that are flexible at room temperature often become very brittle and useless at lower temperatures. Low-temperature flexibility tests herein employed are according to the Clash-Berg Method. This method determines the torsional flexibility of a plastic at various temperatures. The temperature at which the vinyl composition exhibits an arbitrarily established minimum flexibility is defined as the low-temperature flexiblity of the composition. This value may also be defined as the lower temperature limit of the plasticized composition's usefulness as an elastomer.

*Volatility.*—Just as a decrease in temperature often results in decreased flexibility of a plasticized polymer composition, so does a decrease in plasticizer concentration when caused by volatilization of the plasticizer. Hence, plasticizers which are readily volatilized from the plasticized composition as a result of aging or heating are inefficient because, upon volatilization, the plasticized compositions become stiff and hard. The test for plasticizer volatility herein employed is that described by the American Society for Testing Materials under the designation D–1203–55T.

*Water resistance.*—The amount of water absorption and the amount of water leaching that take place when the plasticized composition is immersed in distilled water for 24 hours is determined.

*Hardness.*—A standard instrument made by Shore Instrument Company is used for this determination and expresses the hardness in units from one to 100. The hardness of the composition is judged by its resistance to the penetration of a standard needle applied to the composition under a standard load for a standard length of time.

Of these tests, the compatibility is of primary importance, while the others are only critical for certain applications. If the plasticizer is to be subjected to elevated temperature, a volatility of 4% to 10% is advantageous; otherwise, volatilities as high as 30% are often not objectionable.

The following examples illustrate the advantageous and unexpected results which are achieved by the use of the esters of the present invention in polyvinyl resin compositions, but it is not intended that this invention be limited by or to such examples.

Example I 74 parts of phthalic anhydride and 113 parts of nonylcyclohexanol are charged into a suitable reaction vessel fitted with a spray-trap condenser, an oil-water separator and an efficient agitator. With the contents of the vessel thoroughly agitated, they are heated up to a controlled temperature of from 125–130° C. and held there for about 1 hour. To the resulting nonylcyclohexyl acid phthalate is charged 87 parts of decyl alcohol and 1 part of 78% sulfuric acid. As the mass is being agitated, the system is heated and evacuated to 12 mm. mercury at such at rate that no flooding of the condenser will occur. The reaction temperature is maintained at 125–130° C., and the reflux is maintained at a suitable rate by controlling the vacuum. The forward flow from the condenser is set toward the oil-water separator, and the alcohol is continuously returned to the reactor. The esterification is continued until a titration shows the reaction is essentially complete.

The crude reaction mixture is then cooled, washed with sodium carbonate solution to remove the free acid, and the resulting ester is washed with water. The product is then steam-distilled to remove volatiles, and the sodium carbonate-water treatment is repeated. After the final wash, the wet ester is distilled under vacuum at a temperature of about 100° C. in the presence of activated charcoal. After all the water is removed, the batch is then filtered to remove the charcoal.

The dry product so obtained is a clear, oily liquid which contains 95.5% of decyl nonylcyclohexyl phthalate having the following properties:

Refractive index $n_D^{25}$ _____ 1.4945
Specific gravity 25/25° C. _____ 0.977

Example II

Sixty parts of polyvinyl chloride and forty parts by weight of decyl nonylcyclohexyl phthalate obtained in Example I are mixed on a rolling mill to a homogeneous blend. During the milling substantially no fuming or discoloration is observed. The molded sheet of the mixture is clear, transparent and substantially colorless. Testing of the molded sheet for low-temperature flexibility, according to the procedure described above, gives a value of −13° C., which value denotes good low-temperature properties. A test of the volatility characteristics of the composition gives a value of 2.7%. Tests of the water-resistance properties of the plasticized material, employing the test procedure described above, indicate a solids loss of only 0.06% and a water absorption value of 0.78%. When subjected to heat at a temperature of 150° C. for a period of 30 minutes, the clarity and color of the molded product is substantially unchanged. A Shore hardness value of 84 is obtained on this composition.

Example III

Following the procedure in Example I, isodecyl 4-sec.-butylcyclohexyl phthalate is prepared and has the following properties:

Refractive index (25° C.) _____ 1.4938
Specific gravity 25/25° C. _____ 0.992

Example IV

Sixty parts of polyvinyl chloride and forty parts by weight of the isodecyl 4-sec.-butylcyclohexyl phthalate obtained in Example III are mixed on a rolling mill to a homogeneous blend. During the milling substantially no fuming or discoloration is observed. The molded sheet of the mixture is clear, transparent and substantially colorless. Testing of the molded sheet for low-temperature flexibility yields a value of −21° C. A test of the volatility characteristics of the composition gives a value of 1.0%. When subjected to heat at a temperature of 150° C. for a period of 30 minutes, the clarity and color of the molded product is substantially unchanged. Tests of the water-resistance of the plasticized material show a solids loss of zero percent and a 0.21% water absorption value. A Shore hardness value of 77 is obtained on this composition.

Example V

Following the procedure of Example I, decyl dodecylcyclohexyl phthalate is obtained in an 84% yield. The product so obtained has the following physical properties:

Refractive index (25° C.) _____ 1.493
Specific gravity 25/25° C. _____ 0.965

Example VI

Sixty parts of polyvinyl chloride and forty parts by weight of the decyl dodecylcyclohexyl phthalate obtained in Example V are mixed on a rolling mill to a homogeneous blend. During the milling substantially no fuming or discoloration is observed. The molded sheet of the mixture is clear, transparent and substantially colorless. Testing of the molded sheet for low-temperature flexibility, according to the procedure described above, gives a value of −17.4° C. which denotes good low-temperature properties. A test of the volatility characteristics of the composition gives a value of 5.5%. When subjected to heat at a temperature of 150° C. for a period of 30 minutes, the clarity and color of the molded product is substantially unchanged. Tests of the water-resistance properties of the plasticized material indicate a solids loss of 0.20% and a 0.46% water absorption value. A Shore hardness value of 86 is obtained.

Similar results are obtained when the above substituted cyclohexyl alkyl phthalate esters are compared at 20, 30, 60 and 75 phr. (parts of plasticizer per hundred parts by weight of resin) level.

On substituting for the polyvinyl chloride used in the foregoing examples, other vinyl halide-containing resins, it is found that effective plasticization results are also obtained with such other resins, numerous examples of which are well known to those skilled in the art and have been heretofore described. Results similar to those obtained in the foregoing examples are also obtained when the polyvinyl chloride is replaced by an equivalent amount of a copolymer of 95 parts of vinyl chloride and 5 parts of vinyl acetate, a copolymer of 90 parts vinyl chloride and 10 parts vinylidene chloride, a copolymer of 70 parts of vinyl chloride and 30 parts of diethylmaleate, etc.

When desired, mixtures of the substituted cyclohexyl alkyl phthalate esters and other plasticizers can be used, for example, such conventional plasticizers as diethyl phthalate, dibutyl sebacate, triethyl phosphate, trioctyl phosphate, and methyl phthalyl ethylglycolate.

The plasticized vinyl halide-containing resin compositions of the present invention have good thermal stability; however, for many purposes, it may be advantageous to use known stabilizers in the plasticized compositions.

While this invention has been described with respect to certain embodiments, it is not so limited and it is to be understood that variations and modifications thereof may be made without departing from the spirit or scope of this invention.

The embodiments of the invention in which an exclusive property or privilege is claimed are defined as follows:

A vinyl halide resin composition comprising a vinyl chloride polymer selected from the group consisting of polymerized vinyl chloride monomers and the copolymers of such monomers with an ethylenically unsaturated monomer, at least 50% of the monomer units of said copolymers being vinyl chloride units and from about 5 to about 200 parts by weight of decyl nonylcyclohexyl phthalate per 100 parts by weight of vinyl chloride polymer.

References Cited by the Examiner

UNITED STATES PATENTS

| | | | |
|---|---|---|---|
| 2,325,951 | 8/1943 | Gresham | 260—31.8 |
| 2,862,959 | 12/1958 | Patrick et al. | 260—475 |
| 3,060,224 | 10/1962 | Patrick et al. | 260—475 |

MORRIS LIEBMAN, *Primary Examiner.*

L. T. JACOBS, *Assistant Examiner.*